United States Patent
Szamonek et al.

(10) Patent No.: US 9,729,500 B2
(45) Date of Patent: Aug. 8, 2017

(54) IP ALLOCATION POOLS

(71) Applicant: Google Inc., Mountain View, CA (US)

(72) Inventors: Zoltan Szamonek, Zurich (CH);
Krzysztof Duleba, Zurich (CH); Luuk van Dijk, Zurich (CH)

(73) Assignee: Google Inc., Mountain View, CA (US)

( * ) Notice: Subject to any disclaimer, the term of this patent is extended or adjusted under 35 U.S.C. 154(b) by 726 days.

(21) Appl. No.: 13/950,612

(22) Filed: Jul. 25, 2013

(65) Prior Publication Data

US 2014/0280902 A1     Sep. 18, 2014

Related U.S. Application Data

(60) Provisional application No. 61/787,647, filed on Mar. 15, 2013.

(51) Int. Cl.
*G06F 15/173*     (2006.01)
*H04L 29/12*      (2006.01)
*H04L 12/24*      (2006.01)
*H04L 29/08*      (2006.01)

(52) U.S. Cl.
CPC ...... *H04L 61/2007* (2013.01); *H04L 61/2061* (2013.01); *H04L 41/0813* (2013.01); *H04L 67/22* (2013.01)

(58) Field of Classification Search
None
See application file for complete search history.

(56) References Cited

U.S. PATENT DOCUMENTS

| | | |
|---|---|---|
| 6,665,715 B1 | 12/2003 | Houri |
| 6,684,250 B2 | 1/2004 | Anderson et al. |
| 6,757,740 B1 | 6/2004 | Parekh et al. |
| 7,072,963 B2 | 7/2006 | Anderson et al. |
| 7,437,444 B2 | 10/2008 | Houri |
| 7,472,172 B2 | 12/2008 | Anderson et al. |
| 7,685,279 B2 | 3/2010 | Miltonberger |
| 2003/0067874 A1* | 4/2003 | See ................ H04L 12/4625 370/230.1 |
| 2005/0187934 A1* | 8/2005 | Motsinger ............ H04L 63/107 |
| 2006/0212451 A1* | 9/2006 | Serdy, Jr. .......... G06F 17/30613 |
| 2008/0320119 A1 | 12/2008 | Achan et al. |

(Continued)

OTHER PUBLICATIONS

International Preliminary Report on Patentability in International Application No. PCT/US2014/019850, mailed Sep. 24, 2015, 7 pages.

(Continued)

*Primary Examiner* — Joshua Joo
(74) *Attorney, Agent, or Firm* — Fish & Richardson P.C.

(57) ABSTRACT

Systems, methods, and computer program products involve identifying a first IP block having a first set of IP addresses and a second IP block having a second set of IP addresses, the first set of IP addresses different from the second set of IP addresses. A first expected number of IP reassignments for the first IP block can be determined. A first number of IP reassignments between the first IP block and the second IP block can be identified. The first number of IP reassignments can be compared against the first expected number of IP reassignments. The first IP block and the second IP block can be merged into an IP allocation pool based, at least in part, on the comparison.

24 Claims, 6 Drawing Sheets

(56) References Cited

U.S. PATENT DOCUMENTS

| | | | |
|---|---|---|---|
| 2009/0249480 A1 | 10/2009 | Osipkov et al. | |
| 2011/0282996 A1* | 11/2011 | Zahavi | H04L 65/1063 709/226 |
| 2012/0023562 A1* | 1/2012 | Harp | H04L 63/102 726/7 |
| 2013/0054632 A1 | 2/2013 | van Dijk et al. | |
| 2013/0311649 A1* | 11/2013 | DeFrancesco | H04L 43/04 709/224 |
| 2014/0032689 A1* | 1/2014 | Burstein | H04L 12/5835 709/206 |

OTHER PUBLICATIONS

PCT International Search Report and Written Opinion of the International Searching Authority, PCT/US2014/019850, May 28, 2014, 9 pages.

* cited by examiner

IP ALLOCATION POOLS

TECHNICAL FIELD

This specification relates to identifying Internet Protocol (IP) allocation pools.

BACKGROUND

Internet Service Providers (ISPs) assign IP addresses to their users. This assignment is typically dynamic, for example, using dynamic host configuration protocol (DHCP). Computers that are connected to IP networks generally must be configured with an IP address before they can communicate with other computers on the network. A database may be provided for keeping track of computers that are connected to the network. Such a database can be used to prevent two computers from accidentally being configured with the same IP address. A network administrator for the ISP may reserve a range of IP addresses to be assigned to one or more client computers, and each client computer accessing the network through the ISP may be configured to request an IP address from the server during initialization of the client computer's connection to the network. The request-and-grant process may use a lease concept with a controllable time period, allowing the server to reclaim and then reallocate IP addresses that are not renewed at the end of the lease period. The server may also permanently assign an IP address to a requesting client from the reserved range defined by the administrator. In some cases, the server may keep a table of past IP address assignments, so that it can preferentially assign to a client the same IP address that the client previously had.

SUMMARY

This specification describes technologies relating to identifying IP allocation pools based on user moves between IP addresses.

In general, one aspect of the subject matter described in this specification can be embodied in methods, systems, and computer program products that include the identification of a first IP address assigned to a user, the identification of a change in the IP address assigned to the user from the first IP address to a second IP address, and the identification of an IP allocation pool based, at least in part, on the change in the IP address assigned to the user.

In certain implementations, the identification of the IP allocation pool based on the change in the IP address assigned to the user can include identifying a frequency at which the IP address assigned to the user changes between the first IP address and the second IP address.

In certain implementations, the identification of the IP allocation pool based on the change in the IP address assigned to the user includes comparing the first IP address to the second IP address to determine whether the first and second IP addresses are within a threshold distance from one another. In certain instances, the threshold distance is within a pre-established IP block.

In certain implementations, the identification of the IP address assigned to the user comprises identifying a cookie associated with the user.

In certain implementations, a determination can be made of a first block of IP addresses from a set of IP addresses. A determination can be made of a second block of IP addresses from the set of IP addresses, the second block of IP addresses having IP addresses different from the first block. A number of times the user is assigned each of the IP addresses in the first block can be identified. A number of times the user is assigned each of the IP addresses in the second block can be identified. The number of times the user is assigned at least one of the IP addresses in the first block can be compared with the number of times the user is assigned at least one of the IP addresses in the second block. The first block can be associated with the second block if the number of times the user is assigned at least one of the IP addresses in the first block and the number of times the user is assigned at least one IP address in the second block exceeds a threshold value.

Certain implementations can include an identification of a geographic area of the user based on the identified IP allocation pool.

The methods, systems, and computer program products described herein can also include the generation of a set of IP addresses, the set of IP addresses including a plurality of IP addresses assigned to the user over a time period. A graphical structure of the set of IP addresses can be constructed. The graphical structure is a representation in data of a set of nodes and interconnecting edges that relate each of the plurality of IP addresses assigned to the user over the time period. Each of the plurality of IP addresses assigned to the user over the time period can be represented as a node of the graphical structure and the nodes of the graphical structure can be connected by edges that represent a change in the one or more IP addresses assigned to the user during the time period. One or more blocks of IP addresses can also be identified. Each of the one or more blocks can include a continuous range of IP addresses. The graph can be projected onto the one or more blocks of IP addresses. The one or more blocks of IP addresses can overlap the graph of users moves between IP addresses to show whether and to what extent the moves stay within an IP block or cross from one IP block into another IP block. The term "moves" indicates an IP address reassignment (briefly, IP reassignment). A determination can be made of whether one or more blocks of IP addresses should be identified as being associated based on an overlapping of IP addresses assigned to the user and IP addresses associated with disparate blocks of IP addresses.

In general, another aspect of the subject matter described in this specification can be embodied in methods, systems, and computer program products that include an identification of a first IP block, the first IP block including a first set of IP addresses. A second IP block can be identified, the second IP block including a second set of IP addresses. One or more users assigned to IP addresses in the first IP block can be identified, and one or more users assigned to IP addresses in the second IP block can also be identified. The users assigned to the first IP block can be compared with those of the second IP block. The first IP block can be associated with the second IP block based on the comparison of the users assigned to the first IP block and the second IP block. Associating the first IP block and the second IP block can include identifying the first IP block and the second IP block as being included in a single IP allocation pool.

In certain instances, comparing the users assigned to the first IP block and the second IP block can include comparing moves in IP address assignments within a single IP block to moves in IP address assignments between the first IP block and second IP block.

In certain implementations, an evaluation of a similarity between a distribution of the moves in IP address assignments within each block and a distribution of the moves in IP address assignments between the first block and the second block can be performed. A comparison of the distributions can be performed. IP blocks can be merged into an IP allocation pool if the estimated (or expected) distributions (see P(*|A) or P(*|B) above) are similar, or these distributions are similar to the expected distribution. For example, if the distribution of users originating in block A moving to block A or block B is similar to the observed distribution of moves originating from block B, then blocks A and B can be merged. Or, if an expected distribution is available, the expected distribution should be similar to one or both of P(*|A) or P(*|B). As an example, blocks A and B can be merged if the expected rate of moving from block A to block B versus total moves from A is similar, almost equal to, or is at least |B|/(|A|−1+|B|), which is one way to estimate the expected distribution. As a further example, the number of moves can be observed for A->A, A->B, B->A, B->B, and from these data, two distributions can be estimated:

P(*|A)=[P(A->A)=A->A/(A->A+A->B), P(A->B)=A->B/(A->A+A->B) ], and similarly for P(*|B).

In certain implementations, an identification of a third block of IP addresses, the third block of IP addresses including IP address values between IP address values of the first and second blocks. The third block of IP addresses can be merged with the first and second block of IP addresses based on the comparison of the users assigned to the first IP block and the second IP block, or using some other conditions, such as a lack of counter-evidence and the distance between the IP blocks.

In certain implementations, associating the first block and the second block can include determining that the numerical distance between the IP addresses of the first block and second block are within a predefined threshold.

In certain implementations, a geographic area of one or more users can be identified based on the single IP allocation pool.

Certain implementations of the subject matter can be implemented on a system that includes a user device and one or more computers operable to interact with the device. The one or more computers may also be operable to identifying a first IP address assigned to a user; identifying a change in the IP address assigned to the user from the first IP address to a second IP address; and identifying an IP allocation pool based on the change in the IP address assigned to the user. The one or more computers can include a server operable to interact with the device through a data communication network, and the user device is operable to interact with the server as a client. The user device can be, but is not limited to being, a personal computer running a web browser or a mobile telephone running a wireless application protocol (WAP) browser.

In certain implementations, the one or more computers are further operable to identify a set of IP addresses, the set of IP addresses including a plurality of IP addresses assigned to the user over a time period and construct a graphical structure of the set of IP addresses. The graphical structure can relate each of the plurality of IP addresses assigned to the user over the time period, wherein each of the plurality of IP addresses assigned to the user over the time period is a node of the graphical structure and the nodes of the graphical structure are connected by edges representing a change in the IP address assigned to the user during the time period. The one or more computers are further operable to identify blocks of IP addresses, each of the blocks can include a continuous range of IP addresses, and project the graphical structure onto the blocks of IP addresses. A determination can be made as to whether blocks of IP addresses should be merged based on an overlapping of IP addresses assigned to the user and IP addresses associated with disparate blocks of IP addresses.

The one or more computers are further operable to determine a first block of IP addresses from a set of IP addresses and determine a second block of IP addresses from the set of IP addresses, the second block of IP addresses having IP addresses different from the first block. A number of times the user is assigned each of the IP addresses in the first block can be identified; and a number of times the user is assigned each of the IP addresses in the second block can be identified. The number of times the user is assigned at least one of the IP addresses in the first block can be compared with the number of times the user is assigned at least one of the IP addresses in the second block. The first block can be merged with the second block if the number of times the user is assigned at least one of the IP addresses in the first block and the number of times the user is assigned at least one IP address in the second block exceeds a threshold value, or potentially confirmed by statistical analysis. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. For example, identification of IP allocation pools can improve IP geolocation quality for the identified IP blocks. Further, the geographic scope associated with an IP block can be determined. Also, the IP addresses associated with a particular provider can be determined, and based on that, information about a coverage area for the service provider can be identified. In addition, for IP addresses that are close to one another, a determination can be made as to whether they are within the same IP allocation pool or whether they are in different allocation pools.

The identification of IP allocation pools may also be used to determine whether users are expected to have similar network statistics, such as bandwidth or latency. It may be assumed, based on the identification of IP allocation pools, that users within such pools have similar network properties, and/or geographic location. An identification of moves between IP allocation pools can also be identified, and user services and settings can be automatically adjusted based on the identified allocation pool and corresponding location, network parameters, etc.

Other applications include spam/abuse detection. IP allocation pools allow generalizing IP reputation systems, in two ways. First, a "Bad IP Address" signal—bad in the sense that the IP address is used for suspicious activity—can be shared, perhaps with a smaller weight, across all IP addresses in an allocation pool. The identification of spam/abuse based on the signal can lower the threshold for identifying a bad actor on a particular IP address. Conversely, if an IP is known to be good in some context, for example, a user often logs in from it to their e-mail account, IP addresses from the same allocation pool may be likely to be also good. For example, it is acceptable to log in to an e-mail account from those IP addresses; login attempts from very different IP addresses, i.e., from outside the allocation pool, may continue to be treated suspiciously.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
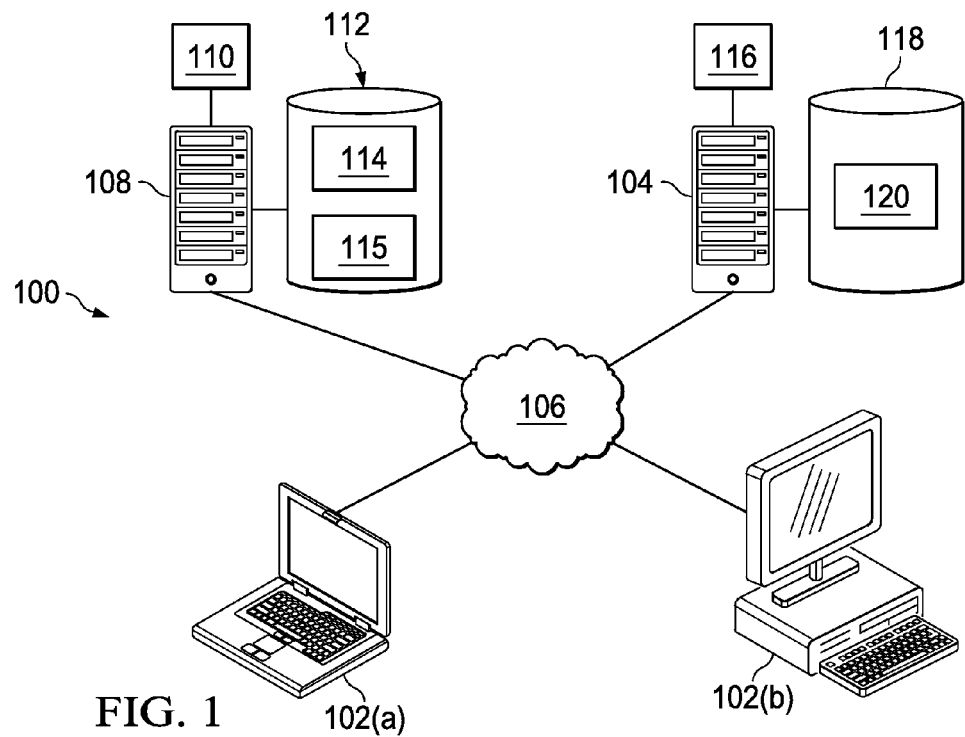
FIG. 1 is a schematic of an example environment for identifying IP allocation pools.

This specification describes systems and techniques for identifying IP allocation pools. As used in this specification, an IP allocation pool may include IP addresses commonly assigned between users within, for example, a geographic location. Recovering (i.e., identifying or inferring) these allocation pools can improve IP geolocation quality for sets or blocks of IP addresses. In some embodiments, IP allocation pools can be identified by observing moves in IP addresses assigned to a user or a group of users. In instances where it is observed that users move frequently between a first IP address and a second IP address, these IP addresses can be considered as a set or block of IP addresses. Likewise, if it is observed that a user moves between IP addresses in two separate blocks of IP addresses, the two blocks of IP addresses may be merged into a single block; that is, two blocks may be considered to have IP addresses within a single IP allocation pool. The IP addresses within the IP allocation pool may be assigned to clients operating within a geographic area. Statistical analysis may be used to determine whether sufficient evidence exists to merge IP addresses or IP blocks; specifically, the probability that certain IP addresses are within a single IP block may be determined by identifying and processing metrics such as the rate of moves by one or more users between IP addresses or blocks of IP addresses.

Certain implementations of the present disclosure may include using cookies to generate a set/sequence of IP addresses visited for each device. A graph can be constructed with IP addresses as nodes of the graph, and moves between IP addresses as edges. Using this graph, statistical tests can be used to discover groups of IPs and remove noise (edges that are not related to allocation pool changes). IP address blocks (or IP blocks) can include a set of continuous IP address ranges. IP address ranges may contain at least 16 IP addresses per allocation pool, and ranges are represented as IP/subnet (the first subnet bits are the same). IP addresses that are next to each other can be grouped. For example, IP addresses can be grouped into blocks of 16 (/28 IP ranges). The above graph can be projected onto these groups. For IP blocks A and B, if the distribution of users moving from IP addresses in block A (e.g., A->A and/or A->B) is similar to the distribution of users moving from IP addresses in block B, these blocks can be merged. In some implementations, these observed distributions can be compared to an expected distribution, which can be estimated by the generalized equations [P(X->A), P(X->B)], where P(X->B)=|B|/(|A|−1+|B|), and P(X->A)=1−P(X->B), and X=A. For X=B, then P(X->B)=(|B|−1)/(|A|+|B|−1).

In some implementations, blocks are not merged if they exceed a certain size already (e.g., 2048 IPs, /21 subnets).

As an illustrative example, assume the following:
IP block A=10.0.0.0/24
IP block B=10.0.1.0/24

If it is determined that these blocks should be merged into an IP allocation pool, the resulting IP allocation pool may include IP addresses from both blocks: 10.0.0.0/23.

In some instances, even though IP blocks may not be "neighboring" IP addresses, it may still be appropriate to merge the blocks. For example:
IP block A=10.0.0.0/24
IP block B=192.168.0.0/24

If it is determined that these blocks should be merged into an IP allocation pool, the resulting IP allocation pool may include IP addresses from both blocks: 10.0.0.0/24+192.168.0.0/24.

If IP block A and C are close to each other (distance in IP space is smaller than a threshold), and there is no evidence that the IP addresses in between them (e.g., IP block B) belong to a different set of users (i.e., different IP allocation pool or maybe different location), IP address block B can be assigned to A and C, thereby creating one larger contiguous block of IP addresses from IP blocks A, B, and C. For example:
IP block A=10.0.0.0/24
IP block C=10.0.5.0/24,
thus: IP block B=10.0.1.0-10.0.4.255

If A and C were merged previously (as described above), and there is no evidence, that B (or parts of B) should be excluded, IP blocks A-C can be merged into one block: 10.0.0.0-10.0.5.255.

FIG. 1 is a schematic of an example environment 100 for identifying IP allocation pools. In this specification, the term identifying can include inferring the existence of an IP allocation pool. One or more client devices (such as client devices 102(a) and 102(b)) may be connected to an online service provider (ISP) 104 through a network 106. The client device 102(a) or 102(b) may connect to ISP 104 through a network 106, and the ISP 104 assigns an IP address to the client device 102(a)/102(b), i.e., a first IP address. On a different day, or later the same day, the client device 102(a) or 102(b) may be assigned a second IP address, different from the first IP address. The client device (such as client device 102(a) or 102(b)) may be a computer or other device that is assigned an IP address to communicate with other systems across a network. For example, a device may use an IP address in communications with other systems across the network, and a user operating the device may have a user name or profile with which an IP address may be associated for statistical analyses and/or for other purposes. The user information 120 (user name, profile, etc.) may be stored on a repository 118 associated with the ISP 104. ISP 104 may include one or more hardware processors 116 that can manipulate the user data 120 stored on repository 118. The IP address can be detected when a user of the device visits a website hosted on a remote server 108. The change in the IP addresses for a client device 102(*a*) or 102(*b*) may be observed and tracked by the remote server 108 to create statistical data 114 about IP address assignments to devices over time by aggregating the data collected with data for other devices. Statistical data 114 may be stored on a repository or other memory 112 associated with the server 108. The server 108 includes one or more hardware processors 110. The server 108 can manipulate data stored on the repository 112, as well as process data received from ISP 104, e.g., user data 120.

The server 108 is configured to process IP allocation data 115 to generate statistical data 114, and is further configured to perform operations to analyze, evaluate, or otherwise process the statistical data 114. The processing and analysis of data to identify IP allocation pools can be performed on the server 108 or on any other server or computing device that has access to the pertinent data. These data may be used to determine whether IP addresses or blocks of IP addresses should be merged together. Geographic location (or geolocation) information may also be estimated by identifying IP allocation pools and evaluating moves by users between IP addresses and/or blocks of IP addresses. For example, using IP allocation pools, it may be determined that particular users are within the same geolocation. Users may move frequently between a set of IP addresses. Statistical analyses may reveal that these users are moving between IP addresses within an IP allocation pool, and this IP allocation pool may correspond with a particular geographic area.

To identify associated IP addresses, a system or program can detect user identification information corresponding to IP addresses used in communications with the system or program. Cookies or other identifiers may be used to generate a set or sequence of IP addresses associated with each client device 102(*a*)/102(*b*). For example, a user may visit a website or log into a mail server operated by a remote server 108 during a first browsing session. The remote server 108 can issue a cookie during the first browsing session and identify a first IP address (IP A) assigned to the user's computer for the first browsing session. Later, in a second browsing session, the user may revisit the mail server or website, but a different IP address (IP B) may be used. The user may be identified in this and subsequent browsing sessions by the cookie. If IP A and IP B are very similar (i.e., have similar numeric values), it can be assumed that IP A and IP B form an IP allocation pool. If there are multiple users moving between IP A and IP B, the likelihood that IP A and IP B form an IP allocation pool increases. An algorithm can be used to determine whether IP A and IP B are within the same IP allocation pool based on the moves of the users between the IP addresses.

A graph may be constructed with IP addresses as nodes, and moves between IP addresses as edges connecting the nodes. Based on such a graph, statistical tests may be employed to identify groups of IP addresses. In addition, noise may be removed, i.e., edges that are not related to allocation pool changes or outliers, nodes of an edge that are not in the same autonomous system (AS), or nodes that are known proxies may be removed.

In some implementations, a computer-implemented method for identifying Internet Protocol (IP) allocation pools may include identifying IP addresses assigned to a plurality of users (i.e., user devices associated with the user has been assigned that IP address). A change in the IP addresses assigned to each of the plurality of users can be identified. An IP allocation pool can be identified based, at least in part, on the change in the IP addresses. In some implementations, a graphical structure can be constructed having nodes that represent IP addresses and edges connecting the nodes that represent moves between IP addresses. A first set of IP addresses and a second set of IP addresses can be identified. The first set of IP addresses may have IP addresses that are similar in numerical value to IP addresses of the second set of IP addresses. For example, IP block A=10.0.0.0/24 and IP block B=10.0.1.0/24 may be considered to have IP addresses that are proximate in numerical value. Likewise, in some implementations, IP block A=10.0.0.0/24 and IP block C=10.0.5.0/24 may be considered close enough together to include IP addresses that are similar in numerical value.

The first set of IP addresses and the second set of IP addresses can be grouped into a group of IP addresses. In some implementations, a graphical structure can be projected onto the group of IP addresses. Identifying an IP allocation pool based, at least in part, on the change in the IP addresses may include identifying that the number of moves between the first set of IP addresses and the second set of IP addresses exceeds a predetermined threshold.

Figure 2A:
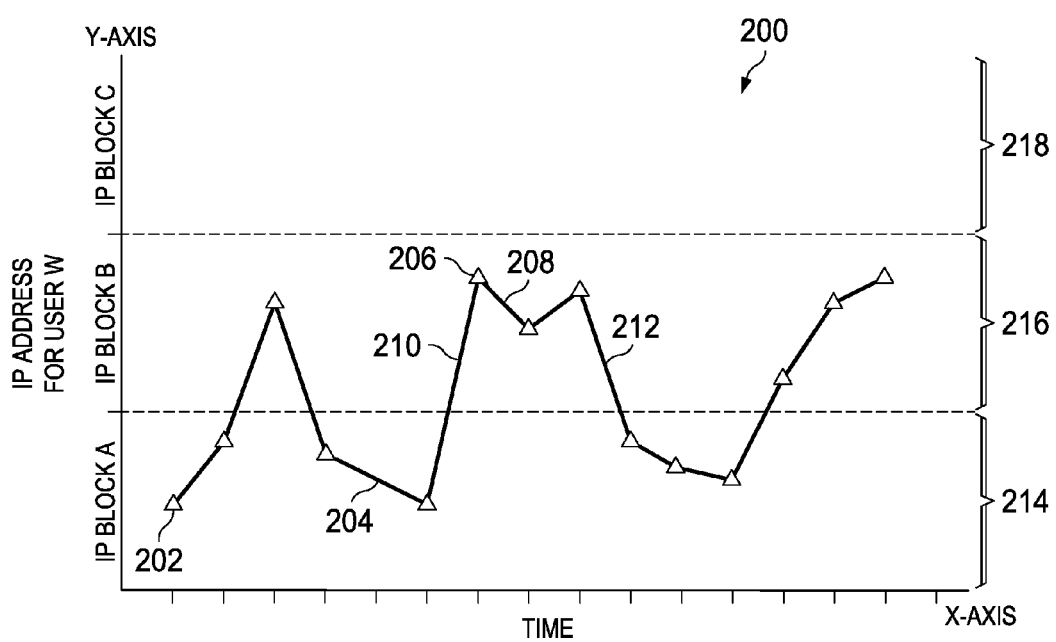
FIG. 2A illustrates an example graphical relationship showing nodes and relations indicating moves in IP addresses for a user over time.

FIG. 2A illustrates an example graphical relationship 200 showing nodes and relations indicating changes in IP addresses for a computer or user over time. The graph 200 has Time on the x-axis and IP addresses on the y-axis. The IP addresses can be continuous, or, more generally, sequential. The graph relates the IP address assigned to users over a period of time. Though discussed for a single user, it is understood that IP address data can be collected for a plurality of users, and aggregated to perform statistical analysis. The use of a single user in the description that follows is to facilitate ease in describing the concepts.

Further, the y-axis is broken into three segments: IP Block A 214, IP Block B 216, and IP Block C 218. Each IP block can include a set of continuous IP ranges or may be discontinuous. IP ranges (i.e., sets of IP addresses) typically have at least about 16 IP addresses per allocation pool, sometimes fewer. Ranges are represented as "IP/subnet." As an example, IP Block A 214 can include IP address values in the following range: 10.0.0.0/24, expressed using the CIDR notation, which includes IP addresses 10.0.0.0-10.0.0.255. IP Block B 216 can include IP addresses in the range 10.0.1.0/24, which includes IP addresses 10.0.1.0-10.0.1.255. The graphical structure (nodes and relations) can be projected onto the x- and y-axes. In certain implementations, IP addresses that are proximate to each other (e.g., IP addresses that are adjacent to or relatively close to one another) can be grouped.

Given the relative sizes of IP blocks, the probability of assignment of an IP address from Block A may be higher or lower (substantially so, at times) than the probability of an assignment of an IP address from Block B. For example, if a first hypothetical block of IP addresses, Block A, included 100 IP addresses and a second hypothetical block of IP addresses, Block B, included 50 IP addresses, the following characteristics (assuming blocks A and B were in the same IP allocation pool) could apply:

|A|=100,
|B|=50,
$P(A \rightarrow A)=(|A|-1)/(|A|-1+|B|)=99/149 \approx 0.66$,
$P(A \rightarrow B)=|B|/(|A|-1+|B|)=50/149 \approx 0.34$,
$P(B \rightarrow A)=|A|/(|B|-1+|A|)=100/149 \approx 0.67$,
$P(B \rightarrow B)=(|B|-1)/(|B|-1+|A|)=49/149 \approx 0.33$, where |A| is the number of IP addresses, active IP addresses, or IP addresses in use in Block A; |B| is the number of IP addresses, active IP addresses, or IP addresses in use, in Block B; $P(A \rightarrow A)$ is the probability of a move starting in block A and ending up in block A; P(A→B) is the probability of a move from A to B; P(B→A) is the probability of a move from B to A; and P(B→B) is the probability of a move starting in block B and ending in block B.

In some implementations, the decision to merge blocks can be done using a comparison of observed moves to expected moves. Note that the number of IP addresses can be determined by different ways, such as identifying IP addresses that have been historically assigned to users over a period of time. Other ways of identifying the number of IP addresses that constitute a block are also available.

In this example, if a user gets a new IP address, the new address would be randomly chosen from either block A or block B (with p=⅔ probability from A, p=⅓ probability from B, due to the difference in sizes of A and B). The observed moves between blocks A and B are as follows:

A->A=30
A->B=12
B->A=19
B->B=10

The distribution of moves is as follows:

30/42=0.71 (1) (indicating the observed distribution of moves that start in A and end in A);
19/29=0.66 (2) (indicating the observed distribution of moves that start in B and end in A); and
99/149=0.66 (e) (indicating the expected distribution of moves that end in A).

If the above values of (1), (2), and (e) are close to each other, the blocks can be merged. For example, the observed value for (1) can be compared to the expected value (e); similar for (2) and (e) or for all three values. If (1) and/or (2) are unreasonably far from the expected (e), the merge can be rejected (and in some instances, the conclusion can be reached that blocks A and B are most probably not part of the same IP allocation pool).

The above example is shown again below with more details. For a user starting in block A, the observed probabilities are as follows:

P^(A->A)=30/(30+12), where P^(A->A) is the probability for moving from an IP address in block A to another IP address in block A based on observations—this value correlates to (1) above;
P^(A->B)=12/(30+12), where P^(A->B) is the probability for moving from an IP address in block A to an IP address in block B based on observations.

The expected probabilities for the user starting in block A are as follows:

P(A->A)=99/(99+50)—this value correlates to (e) above;
P(A->B)=50/(99+50).

For a user starting in block B, the observed probabilities are as follows:

P2^(B->A)=19/(19+10), where P2^(B->A) is the probability for moving from an IP address in block B to an IP address in block A based on observations—this value correlates to (2) above;
P2^(B->B)=10/(19+10), where P2^(B->B) is the probability for moving from an IP address in block B to another IP address in block B based on observations.

The expected probabilities are:

P2(B->A)=100/(100+49);
P2(B->B)=49/(100+49).

Once the values for the probabilities are calculated, they can be compared. Whether the two probability distributions are similar can be calculated based on a desired confidence. To test the similarities, the following hypothesis can be made:

P^ and P are the same distribution (assuming 95% confidence, i.e. in 5% of the cases the hypothesis can be rejected even if it is true);
The expected value of P, E(P), must be in interval:

$$[E(P^{\wedge})+/-z(0.975)*sqrt(E(P^{\wedge})*(1-E(P^{\wedge}))/n)];$$

Where the +/− give the 2 parts of the interval, and in this example, n=30+12=42—the number of samples. E(P^)=P^(A->A) (binomial distribution, with parameter P^(A->A)). The value for z(0.975)=1.96 can be identified from a lookup table and is based on the sum of P^ (i.e., sum of binomial distributions) converges to a normal distribution, z score is based on the distance of the observed value from the mean in case of normal distribution).

Using E(P)=P(A->A)=99/149=0.664 and E(P^)=P^(A->A)=30/(30+12), E(P) must be in the interval defined in the following:

$$[(30/42-1.96*s), (30/42+1.96*s)]=[0.57, 0.85],$$

where s=sqrt((30/42)*(12/42)/42)=0.0697.

Therefore, because E(P)=0.664 is within the interval [0.57, 0.85], P and P^ are sufficiently similar to merge blocks A and B.

The above example correlates to comparing (1) and (e). Similarly, (2) and (e) can be compared. Recall that (2) is P2^(B->A)=19/(19+10)=19/29 and P2^(B->B)=10/29. In that example, E(P2)=P2(B->A)=100/149=0.672 must be in [0.48, 0.82]. Therefore, using the comparison of (2) and (e) also shows that the blocks can be merged.

If P are unknown (that is, if the expected distribution is not known because, e.g., the size of the IP block(s) is not known or it cannot be assumed that the number of IPs in a block predict the distribution of moves), the intervals for both P^ and P2^ can be calculated empirically and their intersection measured. Then E(P2^) should be in the interval based on P^ and similarly E(P^) should be in the interval based on P2^. In this example implementation, the confidence rate could be set higher, so probably a lower z value could be used. For example, instead of z(0.975), z could be set to z(0.9).)

The same statistical approach can reveal that blocks should not be merged. Using the same block A (100 IPs) and block b (50 IPs), the observed moves can be as follows:

A->A=40
A->B=2
B->A=1
B->B=28

The distribution of moves is as follows:

P^(A->A)=40/(40+2)=40/42=0.95 (1') (indicating the observed distribution of moves that start in A and end in A);
P2^(B->A)=1/(1+28)=1/29=0.04 (2') (indicating the observed distribution of moves that start in B and end in A); and
P(A->A)=99/(99+50)=99/149=0.66 (e') (indicating the expected distribution of moves that end in A). Recall that E(P)=P(A->A)=0.66.

Using the statistical approach above, E(P) should be in interval:

$$[E(P^{\wedge})+/-z(0.975)*sqrt(E(P^{\wedge})*(1-E(P^{\wedge}))/n)],$$

using E(P^)=P^(A->A)=40/42=0.95, n=42 samples, z(0.975)=1.96. Therefore, E(P)=99/149=0.664 must be in the following interval:

$$[40/42-1.96*s, 40/42+1.96*s]=[b\ 0.81, 1.08],$$

where s=sqrt(30/42*(12/42)/42)=0.0697. As can be seen, E(P)=0.664 is not part of the expected interval [0.81, 1.08], so these blocks would not be merged.

FIG. 2A is an example graphical representation of IP addresses assigned to a user, referred to as User W. The nodes of the graph represent IP addresses assigned to User W throughout a certain time period. One user's moves are shown for simplicity, though data can be collected for multiple users. The total number of IP addresses in each block may be known or may be discerned over a period of time by tracking user moves. Some IP addresses in a block may not be used, and in some instances, unused IP addresses can be left out of consideration.

In FIG. 2A, node 202 represents an IP address in IP Block A 214. Node 206 represents an IP address in Block B 216. The edges of the graph represent moves by User W between IP addresses. For example, edge 204 represents a "move" for User W from one node in Block A 214 to another node in Block A 214. Similarly, edge 208 represents a move for User W from one node in Block B 216 to another node in Block B 216. Edge 210 represents a move from Block A 214 to Block B 216, and edge 212 represents a move from Block B 216 to Block A 214. The nodes shown in FIG. 2A are meant to be examples and do not represent any particular IP address. In addition, the assignments of IP addresses to User W may occur irregularly, and graph 200 is not meant to be to scale.

In the example shown in FIG. 2A, the User W is assigned IP addresses from IP Blocks A 214 and B 216. More specifically, the graph of FIG. 2A shows that User W moves between (or is assigned) IP addresses in IP Block A 214 four times (A to A moves). The user moves between IP addresses in IP Block B 216 four times (B to B moves). The user moves between Block A 214 and Block B 216 five times. These numbers are meant to be illustrative. In some scenarios, the numbers may be much larger and/or the number of users moving among and between the IP blocks may be larger.

As described above, the graphical structure 200 can be projected onto the groupings of IP addresses (i.e., IP Blocks A-C), as shown in FIG. 2A. A check can be performed to determine whether neighboring IP Blocks belong together as a single block to form an IP allocation pool. In an example implementation, if the distribution of user moves originating from IP block A 214 is similar to user moves originating from IP block B 216, blocks A and B can be merged. If expected moves are unknown, it may be sufficient to compare observed moves for moves between block A and block B to moves between IP assignments within block A. A statistical approach can be used to determine whether the assignment distribution is similar enough to warrant a merging of IP blocks. For example, it may be determined whether the rate of moves between Block A 214 and Block B 216 is numerically similar to the expected rate of moves from Block A 214 to Block B 216 assuming block A and block B are part of the same IP allocation pool.

If a user moves in blocks A or B or between them, there are a total of $(|A|-1+|B|)$ IP addresses to move to between the IP blocks. If the user moves to an IP address in Block A 214 from Block B 216, the chance of that move is then the number of IP addresses in block A the user can move to divided by the total number of IP addresses that can be moved to, or $|A|/(|B|-1+|A|)$. For a user moving from an IP address in Block A 214 to another IP address in Block A 214, the likelihood of that move is the number of IP addresses in block A divided by the total number of IP addresses that can be moved to, or $(|A|-1)/(|A|-1+|B|)$. Assuming that $|A|=|B|$, if the number of observed moves between IP addresses in block A is approximately equal to the number of moves from IP addresses in block A to IP addresses in block B, as predicted, IP blocks A and B can be merged since they are likely in a common IP allocation pool. In certain implementations, the merging can be skipped if the IP block is already a certain size (e.g., 2048 IPs, /21 subnets). The examples assume that the probability of the user getting an IP address from the allocation pool is uniform across all of the IP addresses. In certain implementations, certain distortions can be accounted for in this assumed distribution, e.g., for an allocation policy of issuing the smallest available IP addresses.

Figure 2B:
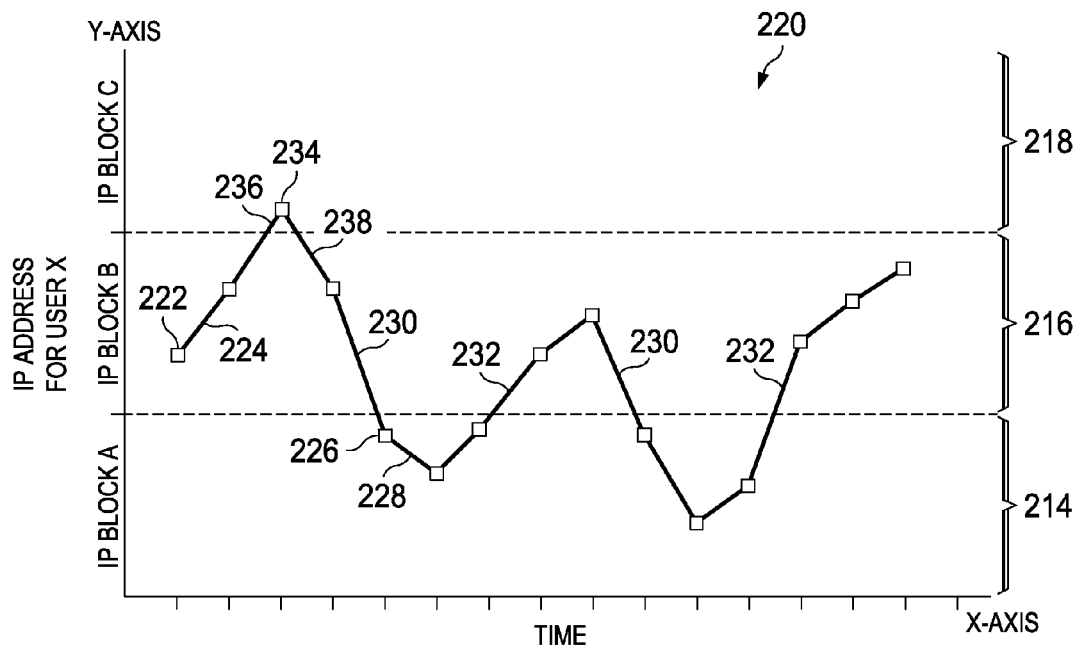
FIG. 2B illustrates an example graphical relationship showing nodes and relations indicating moves in IP addresses for a user over time.

FIG. 2B illustrates an example graphical relationship 220 showing nodes and relations indicating changes in IP addresses for User X over time. FIG. 2B shows a similar scenario as FIG. 2A, but in FIG. 2B, there is a move from Block B to Block C. The data shown on the graph of FIG. 2B indicates several moves between and within Blocks A and B. The move to Block C could be considered noise or an outlier. For example, a user may have taken a flight out of town for a business trip, which may account for the IP address outside of Blocks A and B, or the user logs on using a WiFi or other Internet access point, e.g., at a coffee shop or bookstore, or visited a friend and uses the friend's Internet connection. In these examples, even though there is a data point for Block C, the IP addresses in Block C should not be merged with A and B. As explained below, this conclusion can be reached by comparing the number of observed moves between blocks B and C to the number of predicted moves between blocks B and C assuming blocks B and C are in a common allocation pool.

Referring to FIG. 2B, the y-axis is broken into three segments: IP Block A 214, IP Block B 216, and IP Block C 218. The nodes of the graph represent IP addresses assigned to User X at a certain time period. In FIG. 2B, node 222 represents an IP address in IP Block B 216. Node 234 represents an IP address in Block C 218. Node 226 represents an IP address in Block A 214. The edges of the graph represent moves by User X between IP addresses. For example, edge 224 represents a "move" for User X from one node in Block B 216 to another node in Block B 216. Similarly, edge 228 represents a move for User X from one node in Block A 214 to another node in Block A 214. Edge 232 represents a move from Block A 214 to Block B 216, and edge 230 represents a move from Block B 216 to Block A 214. In FIG. 2B, there are no moves by User X from a node in Block C to another node in Block C; however, FIG. 2B does show a move from an IP address node in Block B to a node in Block C, which is represented as edge 236. Likewise, a move from Block C to Block B is represented by edge 238. The nodes shown in FIG. 2B are meant to be examples and do not represent any particular IP address. In addition, the assignments of IP addresses to User X may occur irregularly, and graph 220 is not meant to be to scale.

In the example shown in FIG. 2B, the User X is assigned IP addresses from IP Blocks A 214, B 216, and C 218. More specifically, the graph of FIG. 2B shows that User X moves between (or is assigned) IP addresses in IP Block A 214 four times (A to A moves). The user moves between IP addresses in IP Block B 216 four times (B to B moves). The user moves between Block A 214 and Block B 216 four times. Also, the user moves between Blocks B and C two times. These figures were calculated by counting the edges between nodes. These numbers are meant to be illustrative. In some implementations, the numbers may be much larger and/or the number of users moving among and between the IP blocks may be larger. The observed moves between and within blocks A, B and C can be compared to expected moves between and within blocks A, B, and C to determine which (if any) of blocks A, B, and C can be merged.

Figure 2C:
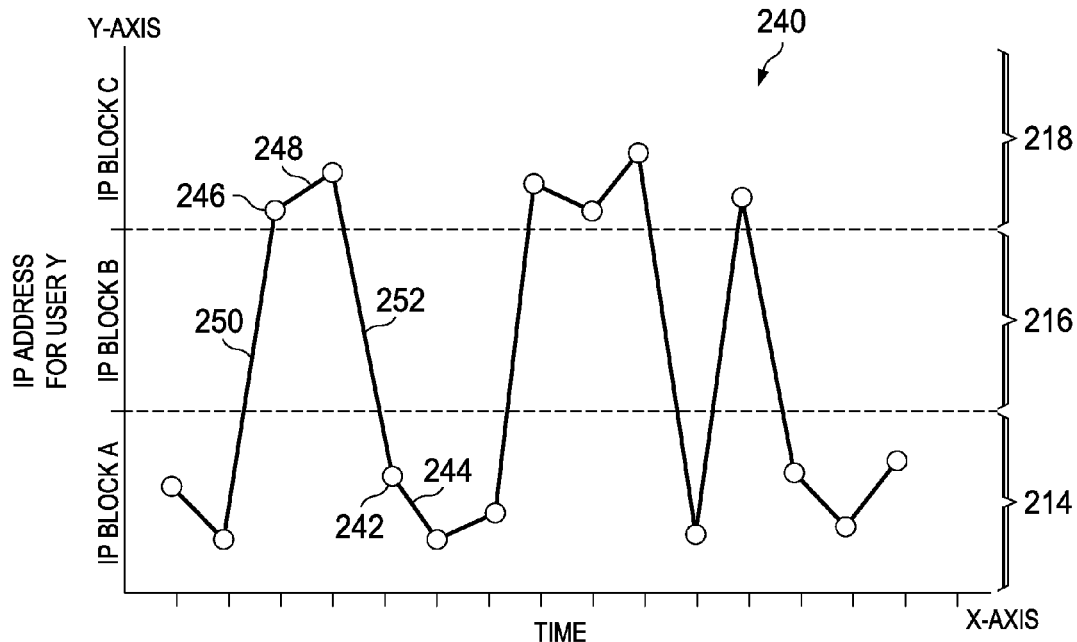
FIG. 2C illustrates an example graphical relationship showing nodes and relations indicating moves in IP addresses for a user over time.

FIG. 2C illustrates an example graphical relationship 240 showing nodes and edges indicating changes in IP addresses for User Y over time. In FIG. 2C, IP Blocks A and C are relatively close to each other. That is, the IP addresses within each block are relatively close to each other. For example, IP Block A may include IP addresses in the range 10.0.0.0/24, and IP Block C may include IP addresses in the range 10.0.5.0/24. IP Block B would therefore include the range 10.0.1.0-10.0.4.255. If two IP blocks having IP ranges that are relatively close to each other can be merged. The merged IP block may include the IP addresses between the two mergeable IP blocks. In the example shown in FIG. 2C, if Blocks A and C can be merged based on the relative moves of IP addresses between blocks A and C, block B can be included in the merger based on the proximity of IP addresses in blocks A and C even though there is no evidence of moves between blocks A and B or between blocks B and C. To summarize, if Blocks A and C are merged and are within a threshold distance of each other in IP space, and there is no evidence that Block B which separates block A from block C in IP space should be excluded from the merger, then Block B can be merged with A and C. Counter evidence may be the observation of significant amount of moves within block B, but no moves from block B to block A or block C.

Referring to FIG. 2C, the y-axis is broken into three segments: IP Block A 214, IP Block B 216, and IP Block C 218. The nodes of the graph represent IP addresses assigned to User Y at a certain time period. In FIG. 2C, node 242 represents an IP address in IP Block A 214. Node 246 represents an IP address in Block C 218. There are no IP address assignments in Block B. The edges of the graph represent moves by User Y between IP addresses. For example, edge 244 represents a "move" for User Y from one node in Block A 214 to another node in Block A 214. Similarly, edge 248 represents a move for User Y from one node in Block C 218 to another node in Block C 218. Edge 250 represents a move from Block A 214 to Block C 218, and edge 252 represents a move from Block C 218 to Block A 214. In FIG. 2B, there are no moves by users from a node in Block B to another node in either Block A or Block C. The nodes shown in FIG. 2C are meant to be examples and do not represent any particular IP address. In addition, the assignments of IP addresses to User Y may occur irregularly, and graph 240 is not meant to be to scale.

In the example shown in FIG. 2C, the User Y is assigned IP addresses from IP Blocks A 214 and C 218. More specifically, the graph of FIG. 2C shows that User Y moves between IP addresses in IP Block A 214 five times (A to A moves). The user moves between IP addresses in IP Block C 218 three times (C to C moves). The user moves between Block A 214 and Block C 218 six times. These figures were calculated by counting the edges between nodes. These numbers are meant to be illustrative. In some implementations, the numbers may be much larger and/or the number of users moving among and between the IP blocks may be larger.

Figure 2D:
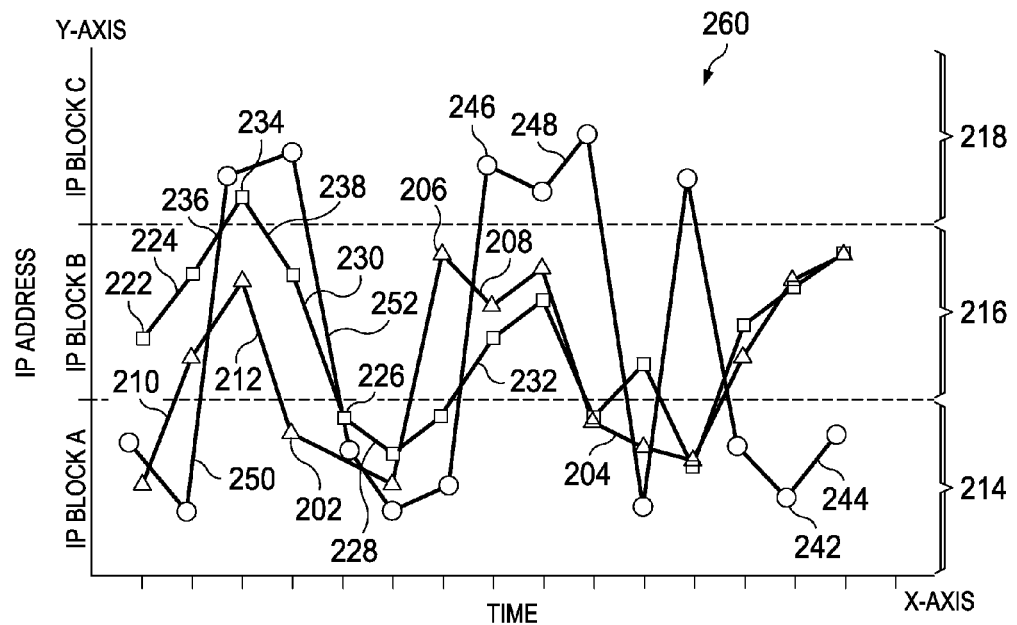
FIG. 2D illustrates an example graphical relationship showing nodes and relations of FIGS. 2A-C overlapping each other.

FIG. 2D illustrates an example graphical relationship 260 showing IP addresses (nodes) and moves between IP addresses (edges) of multiple users overlapping each other. In FIG. 2D, data from other users has been aggregated. The data has been converted into a graphical format and projected onto the combined IP blocks. In FIG. 2D, the nodes and edges are taken from FIGS. 2A-C above. In this example, users move within and between all three IP blocks.

Based on the sizes of the blocks, the observed moves between and within blocks, and the expected moves between and within blocks assuming the blocks are all in the same IP allocation pool, there may be sufficient evidence to merge all three blocks together.

Figure 3:
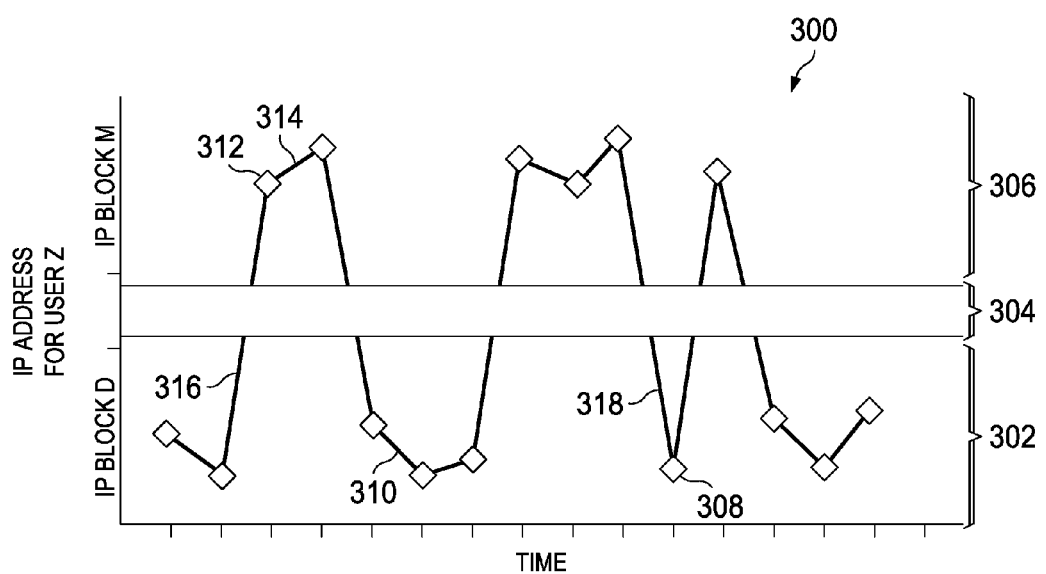
FIG. 3 illustrates an example graphical relationship showing nodes and relations indicating moves in IP addresses for a user over time.

FIG. 3 illustrates an example graphical relationship 300 showing IP addresses (nodes) and moves between IP addresses (edges) indicating changes in IP addresses for User Z over time. In FIG. 3, User Z may move between and within Blocks D 302 and M 306, which in the example are IP Blocks having discontinuous IP addresses between them. Region 304 represents one or more IP addresses or blocks of IP addresses between Block D 302 and Block M 306. For example, Block D 302 may include IP addresses in the range 10.0.0.0/24 and IP Block M 306 may include the range 192.168.0.0/24; thus, the IP addresses within each IP block may be continuous, but the two ranges would be discontinuous relative to each other. The moves within and between the IP Block D 302 and IP Block M 306 can be identified to determine the probability of a single user moving within an IP block and to determine the probability of a single user moving between the IP blocks. If statistical analyses confirm that the user moves between blocks with sufficient probability as compared to the probability of moving within a block, the blocks can be merged.

In FIG. 3, User Z is assigned IP addresses in Block D 302, which are represented as nodes, such as node 308. Moves between IP addresses in Block D 302 are represented as edges, such as edge 310. Similarly, User Z may be assigned IP addresses from IP addresses in Block M 306, which are represented as nodes, such as node 312. Moves between IP addresses in Block M 306 for User Z are represented as edges, such as edge 314. Here, User Z is assigned IP addresses from both Block D 302 and Block M 306. Thus, FIG. 3 shows moves from an IP address in Block D 302 to an IP address in Block M 306 as an edge 316. Edge 316 graphically traverses region 304, and such a graphical traversal is illustrated as a dashed line segment. Edge 318 illustrates a move between an IP address in Block M to an IP address in Block D. The moves within each block may be compared with moves between the two blocks to determine, statistically, whether the two blocks should be merged.

In addition, in the absence of contradictory information, the IP blocks that separate Blocks D and M may be merged as well. Such contradictory information may include, but is not limited to, statistical information indicating that merging an IP block would be incorrect. Other examples of contradictory information include that Blocks D 302 and M 306 and region 304 are not in the same autonomous system; or that region 304 has more than a few users. Contradictory information may also include the numerical distance or some other distance metric between block D and M. In this example, Block D=10.0.0.0/24 and Block M=192.168.0.0/24, which are numerically very far away from each other. The numerical distance between Block D and M in this example is very great, and thus contradictory information exists indicating that region 304 should not be merged with these two blocks. Also, geographic data associated with one or more IP blocks in region 304 may indicate that merging it with Blocks D and M would be improper. In addition, and as mentioned above, an IP block size may be limited to a certain number or range of IP addresses.

Figure 4:
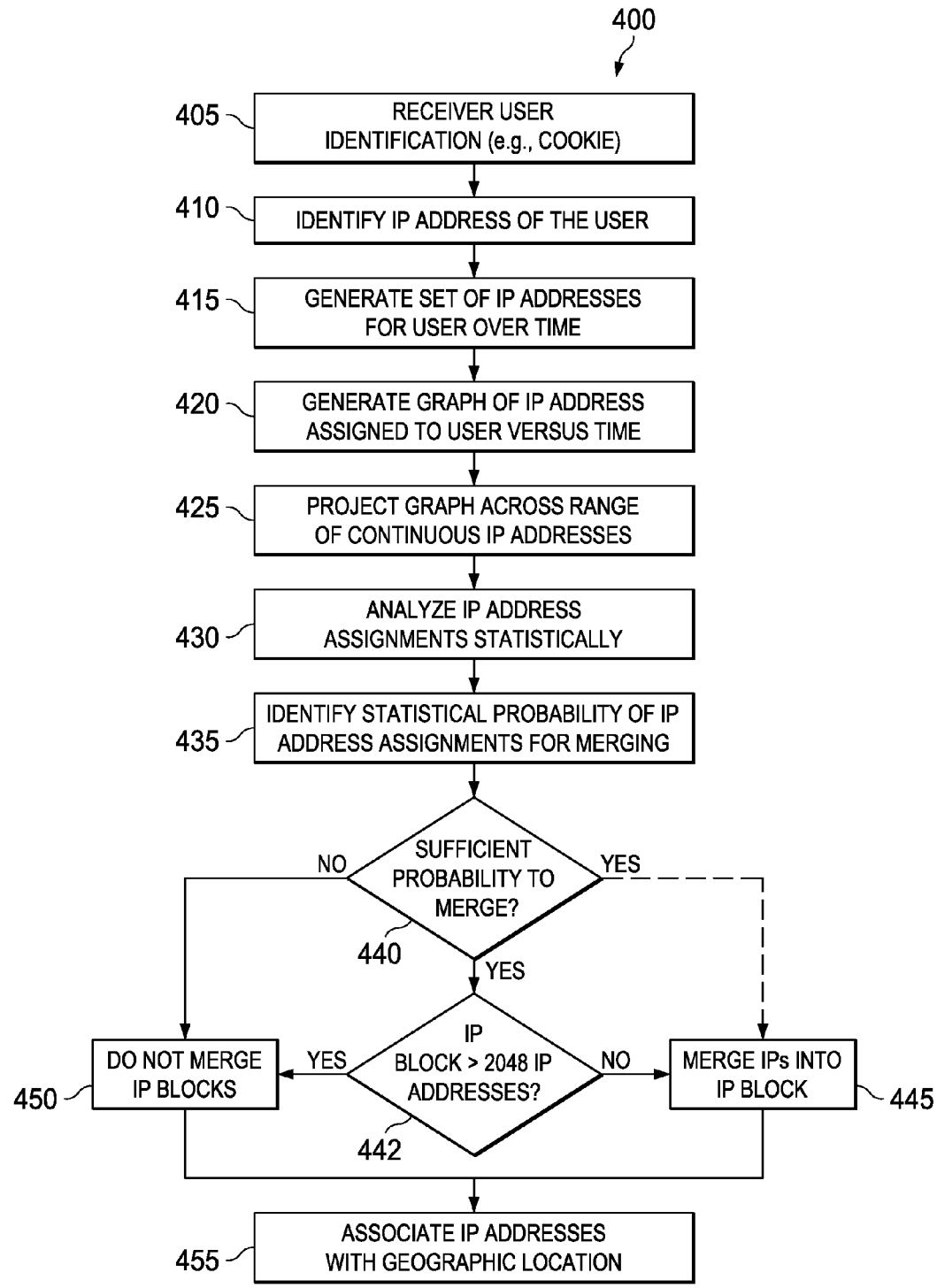
FIG. 4 is an example process flow diagram for identifying IP allocation pools.

FIG. 4 is a process flow diagram 400 for identifying IP allocation pools. A user's IP address is identified 410. In certain instances, the IP address is identified by the machine serving the user. The user can be identified by a unique cookie 405. The user moves from one IP address to another IP address may be identified by observing the same cookie associated with a new IP address.

A set or sequence of IP addresses assigned to the user over a period of time can be obtained by tracking the user's cookie, and the set or sequence can be aggregated with sets or sequences of IP addresses for other users over the period of time. A block of IP addresses assigned to the users can be generated 415. A graph can be generated that shows the moves among IP addresses assigned to the users over the time period 420. The nodes of the graph are the IP addresses, and the edges of the graph represent the moves from one IP address to another. The graph can be projected onto a block of IP addresses 425 broken up into IP blocks. Initially, the block of IP addresses may be broken up into blocks of 16 (/28 IP ranges), though other conditions may apply. For example, if the block contains a known (or assumed) proxy, that proxy should be removed from the block (or the block may be broken into pieces).

The projection provides data showing the moves of IP addresses assigned to a user or users over time within and between pre-existing blocks, groupings, or ranges of IP addresses. If the distribution of users moving to block A or block B are similar regardless of whether originating from block A or block B, blocks A and B can be merged. To that end, a statistical analysis can be performed to analyze the moves of IP address assignments within a block and between blocks 430. First, statistical probabilities for the moves of IP addresses within IP blocks can be calculated (e.g., as shown above) assuming the IP blocks are in a common IP allocation pool 435. A determination can then be made from the graph showing actual IP address moves within and between blocks as to whether the observed probabilities of IP moves between and within blocks is sufficiently comparable to the calculated probabilities to warrant merging the observed IP blocks 440. If there is a sufficiently high probability that the blocks should be merged, then such a merging can be performed 445. In some embodiments, a determination can be made as to whether one or both of the IP blocks are too large to merge 442. For example, if the size of at least one of the IP blocks exceeds a threshold value (e.g., 2048 IP addresses), then the blocks are not merged 450. If the size of both of the IP blocks does not exceed a threshold number of IP addresses, the blocks can be merged 445. Among other things, the merged IP block can be used in a process for determining a geographic location or geographic area of users assigned IP addresses from the IP block 455.

Figure 5:
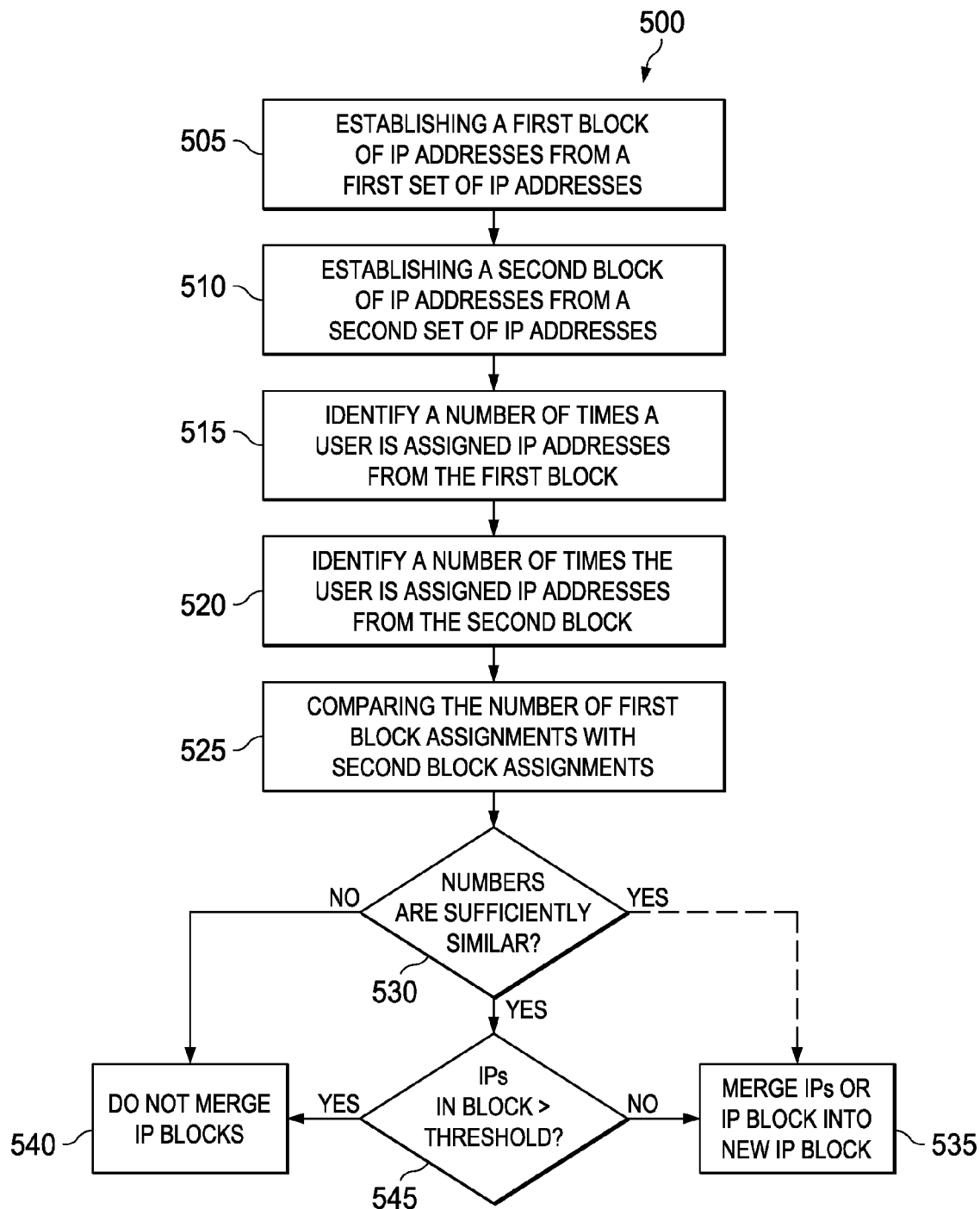
FIG. 5 is an example process flow diagram for identifying IP allocation pools.

FIG. 5 is an example process flow diagram 500 for identifying IP blocks to be merged. A first block of IP addresses from a block of IP addresses can be established or identified 505. The first IP block can include a range of IP addresses from the block of IP addresses. A second block of IP addresses can be established from the block of IP addresses, the second block of IP addresses having IP addresses different from the first block 510. The number of times users are assigned IP addresses in the first block can be identified 515. In addition, the number of times the users are assigned each of the IP addresses in the second block can be identified 520. The number of times the user is assigned an IP address in the first block is compared with the number of times the user is assigned at least one of the IP addresses in the second block 525. A statistical determination is made as to whether the IP blocks should be merged 530. If the statistical analysis indicates that the observed values match or are similar to, i.e., similar relative to the number of IP addresses in each block, the IP blocks may be merged 535. If the statistical analysis indicates that the moves are not similar, i.e., not similar relative to the number of IP addresses in each block, no merging should occur 540. In certain implementations, a comparison can be made to determine whether the number of IP addresses in the new block would exceed a threshold number, e.g., 2048 IP addresses, 545. If the number of IP addresses in the new block would exceed a threshold number, then the IP blocks would not be merged 540. If the resulting IP block would not have a number of IP addresses exceeding the threshold number, then the IP blocks can be merged 535.

In some implementations, a ratio of the distributions can be determined. IP blocks can be merged if the ratio of total changes of IP addresses to the changes of IP addresses between two IP blocks falls within a specified or predetermined range. That is, if the distribution of users moving between block A and B is similar to moving within A or B, then blocks A and B can be merged. As an example, blocks A and B can be merged if the expected rate of moving from A to B versus total moves is at least $|B|/(|A|-1+|B|)$.

IP blocks can be established initially based on IP address continuity. In that case, an IP block can be established at the outset without identifying user moves between the IP addresses. Alternatively, a block can be initially identified by identifying user moves as described above. In that case, instead of "merging" IP blocks, an IP block can be created by projecting the graphical structure onto a range of continuous or sequential IP addresses that have not been further categorized.

The identification of an IP allocation pool may be erroneous. IP allocation pools can be confirmed through subsequent statistical analyses of IP assignments to one or more users. Erroneous identifications of IP allocation pools can be addressed, for example, by reevaluating the statistical approaches taken to identify the allocation pools. Several different steps can be taken to rectify misidentified pools. For example, one or more IP addresses may be removed from the IP allocation pool if those IP addresses were specifically identified to be statistically improper for inclusion. Likewise, an entire block of IP addresses may be removed from the allocation pool if a statistically high number of IP addresses within the block fall outside of the allocation pool. Other remedies may also be undertaken. Errors in identifying allocation pools may also result from other factors, such as changes in IP address allocation by the ISP. Similar remedies may be undertaken in such events.

Figure 6:
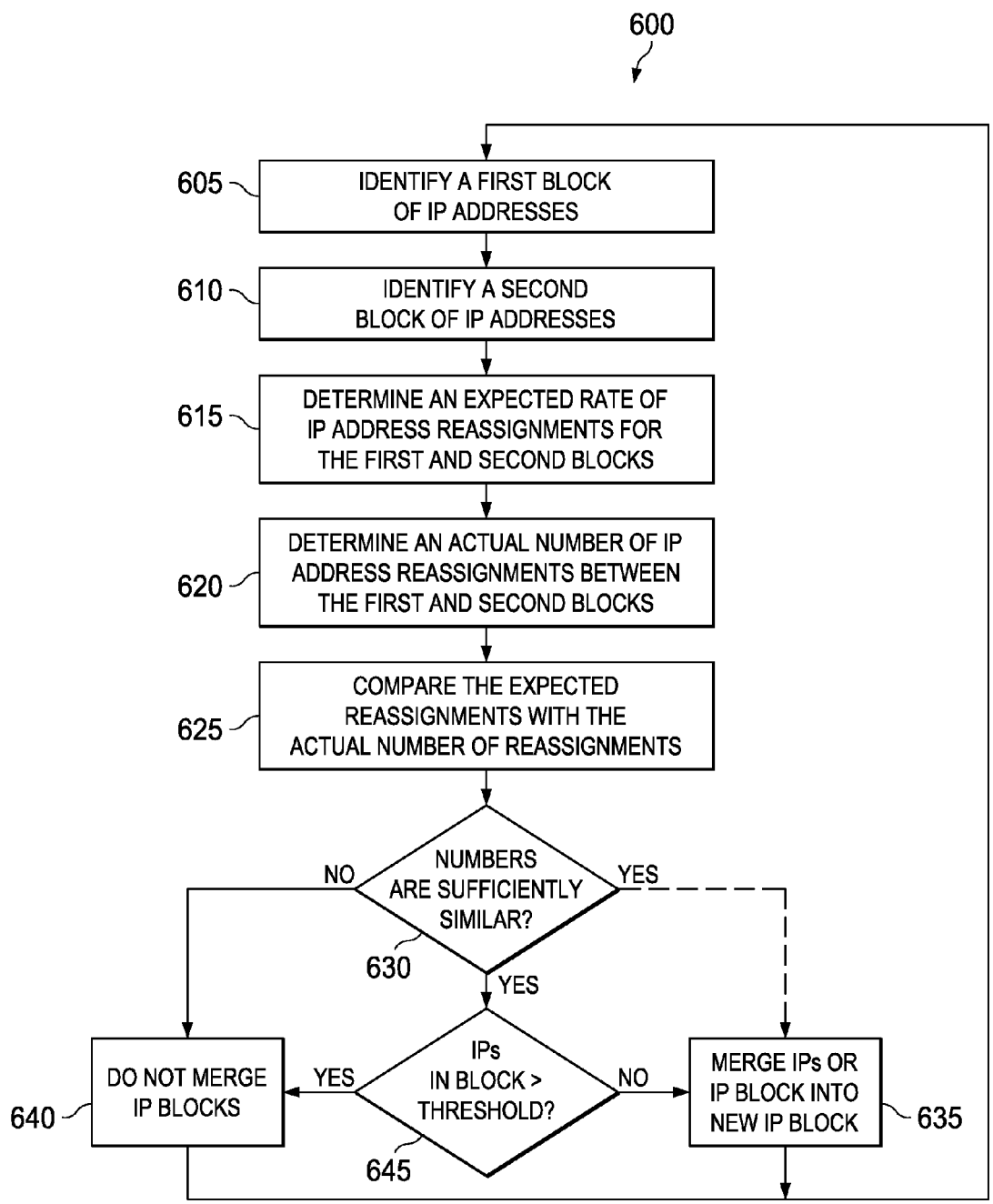
FIG. 6 is another example process flow diagram for identifying IP blocks to be merged.

FIG. 6 is another example process flow diagram 600 for identifying IP blocks to be merged. A first block of IP addresses can be identified (605). A second block of IP addresses can also be identified (610). The first and second IP blocks can be initially established based on IP address continuity. Alternatively, the first and second IP blocks can be established by tracking unique cookies and observing user moves between IP addresses. In general, user moves will be limited to moves within a block of IP addresses assigned to a single IP allocation pool. The first and second blocks of IP addresses can be of different respective sizes, or can be the same size.

Expected rates of IP address reassignment within and between the blocks can be determined (615). These expected rates can be determined by identifying the number of IP addresses in each block, and based on the assumption that the IP addresses in the two blocks are in a common allocation pool and that IP addresses are randomly reassigned within the allocation pool. The actual number of IP reassignments between the first and second blocks can be measured (620). This actual number can be measured from data collected over a period of time. The IP addresses that are assigned to computers can be uniquely identifiable based on unique cookie IDs that are assigned to the computers.

The actual number of IP reassignments between the first and second blocks can be compared against the expected number of IP reassignments between the blocks (625). In some implementations, the total number of IP reassignments between IP addresses within the first IP block can be compared against the number of IP reassignments from the first IP block to the second IP block. The total number of IP reassignments between IP addresses within the second IP block can be compared against the number of IP reassignments from the second IP block to the first IP block.

It can be determined if the actual number of IP reassignments between blocks is statistically similar to the expected number of reassignments (630). The two IP blocks can be merged if the measured and expected rates of IP address reassignment are comparable (e.g., merge if the measured rate>90% of the expected rate) (635). Otherwise, the blocks are not merged (640), and the cycle repeats. That is, a new set of blocks can be identified in the manner above, or the first and second IP blocks can be split for further analysis.

In some implementations, it can be determined whether the number of IP addresses in either or both of the first and second IP blocks exceed a threshold number (645). If the number of IP addresses is not too high, then the blocks can be merged (635). If the number of IP addresses is too high, then the blocks are not merged (640).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses different kinds of apparatuses, devices, and machines for processing data including, by way of example, a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, smartphone, tablet, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. For example, given a single IP block where actual IP reassignments within the IP block are far fewer than the expected moves within the IP block, the IP block can be split based on other information, and in some instances, the portions of the IP block can be merged with other IP blocks. Additionally, a single IP block can be split prior to any analysis in order to identify the first and second IP blocks that are used in the analysis.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results.

In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for identifying Internet Protocol (IP) allocation pools comprising:
    updating network information for a plurality of client devices by:
        identifying a first IP block having a first set of IP addresses and a second IP block having a second set of IP addresses;
        determining, for a particular period of time, an expected number of IP reassignments from the first IP block to the second IP block;
        determining an observed number of IP reassignments from the first IP block to the second IP block that occurred within the period of time, the determining comprising, for each client device, obtaining a sequence of IP addresses used by the client device, each sequence of IP addresses created based on IP addresses of browsing sessions that are associated with a cookie issued to the client device;
        comparing, for the period of time, the observed number of IP reassignments with the expected number of IP reassignments; and
        merging, after the period of time, the first IP block and the second IP block into an IP allocation pool based, at least in part, on the comparison; and
    modifying services provided to one of the client devices based on the network information, the modifying comprising automatically adjusting network settings for the one of the client devices based on the allocation pool for the one of the client devices.

2. The method of claim 1, wherein merging the first IP block and the second IP block further comprises:
    determining a second expected number of IP reassignments for the second IP block;
    determining a second observed number of IP reassignments from the second IP block to the first IP block; and
    comparing the second observed number of IP reassignments to the second expected number of IP reassignments;
    wherein merging the first IP block and the second IP block is further based on the comparison of the second observed number of IP reassignments to the second expected number of IP reassignments.

3. The method of claim 1, wherein the first IP block and second IP block are merged if the observed number of IP 4. The method of claim 1, wherein determining the expected number of IP reassignments from the first IP block comprises calculating one or both of a probability of IP reassignment from an IP address in the first IP block to another IP address in the first block or a probability of IP reassignment from an IP address in the first IP block to an IP address in the second IP block.

5. The method of claim 1, further comprising:
for each IP address reassignment, determining which IP block the reassigned IP address is located in.

6. The method of claim 1, wherein modifying services provided to one of the client devices based on the network information comprises providing a geographic-based service to one of the client devices based on the network information.

7. The method of claim 1, wherein modifying services provided to one of the client devices based on the network information comprises modifying services provided to one of the client devices based on network metrics of other client devices in the plurality of client devices.

8. The method of claim 1, wherein modifying services provided to one of the client devices based on the network information comprises restricting services provided to one of the client devices based on a restriction applied to another of the client devices in the plurality of client devices.

9. A system comprising:
a plurality of user devices; and
one or more computers operable to interact with the plurality of user devices and to:
update network information for a plurality of client devices by;
identify a first IP block having a first set of IP addresses and a second IP block having a second set of IP addresses, the first set of IP addresses different from the second set of IP addresses;
determine, for a particular time period, a first expected number of IP reassignments for the first IP block;
identify a first number of IP reassignments between the first IP block and the second IP block that occurred within the time period, the identifying comprising, for each client device, obtaining a sequence of IP addresses used by the client device, each sequence of IP addresses created based on IP addresses of browsing sessions that are associated with a cookie issued to the client device;
compare, for the time period, the first number of IP reassignments with the first expected number of IP reassignments; and
merge, after the time period the first IP block and the second IP block into an IP allocation pool based, at least in part, on the comparison; and
modify services provided to one of the client devices based on the network information, the modifying comprising automatically adjusting network settings for the one of the client devices based on the allocation pool for the one of the client devices.

10. The system of claim 9, wherein the one or more computers are further operable to:
determine a second expected number of IP reassignments for the second IP block and identifying a second number of IP reassignments from the second IP block to the first IP block; and
compare the second number of IP reassignments to the second expected number of IP reassignments;
wherein merging the first IP block and the second IP block is further based on the comparison of the second number of IP reassignments to the second expected number of IP reassignments.

11. The system of claim 9, wherein the first IP block and second IP block are merged if the observed number of IP reassignments are determined to be within a threshold number of the first expected number of IP reassignments.

12. The system of claim 9, wherein determining the expected number of IP reassignments from the first IP block comprises calculating one or both of a probability of IP reassignment from an IP address in the first IP block to another IP address in the first block or a probability of IP reassignment from an IP address in the first IP block to an IP address in the second IP block.

13. The system of claim 9, wherein determining an observed number of IP reassignments comprises: for each IP address reassignment, determining which IP block the reassigned IP address is located in.

14. The system of claim 9, wherein modifying services provided to one of the client devices based on the network information comprises providing a geographic-based service to one of the client devices based on the network information.

15. The system of claim 9, wherein modifying services provided to one of the client devices based on the network information comprises modifying services provided to one of the client devices based on network metrics of other client devices in the plurality of client devices.

16. The system of claim 9, wherein modifying services provided to one of the client devices based on the network information comprises restricting services provided to one of the client devices based on a restriction applied to another of the client devices in the plurality of client devices.

17. A computer program product tangibly embodied on a non-transitory medium, the computer program product comprising instructions operable when executed to:
update network information for a plurality of client devices by:
identify a first IP block having a first set of IP addresses and a second IP block having a second set of IP addresses, the first set of IP addresses different from the second set of IP addresses;
determine, for a particular time period, a first expected number of IP reassignments for the first IP block;
identify a first number of IP reassignments between the first IP block and the second IP block that occurred within the time period, the identifying comprising, for each client device, obtaining a sequence IP addresses used by the client device, each sequence of IP addresses created based on IP addresses of browsing sessions that are associated with a cookie issued to the client device;
compare, for the time period, the first number of IP reassignments with the first expected number of IP reassignments; and
merge, after the time period the first IP block and the second IP block into an IP allocation pool based, at least in part, on the comparison; and
modify services provided to one of the client devices based on the network information, the modifying comprising automatically adjusting network settings for the one of the client devices based on the allocation pool for the one of the client devices.

18. The computer program product of claim 17, wherein merging the first IP block and the second IP block further comprises:

determining a second expected number of IP reassignments for the second IP block;
determining a second observed number of IP reassignments from the second IP block to the first IP block; and
comparing the second observed number of IP reassignments to the second expected number of IP reassignments;
wherein merging the first IP block and the second IP block is further based on the comparison of the second observed number of IP reassignments to the second expected number of IP reassignments.

19. The computer program product of claim 17, wherein the first IP block and second IP block are merged if the observed number of IP reassignments are determined to be within a threshold number of the expected number of IP reassignments.

20. The computer program product of claim 17, wherein determining the expected number of IP reassignments from the first IP block comprises calculating one or both of a probability of IP reassignment from an IP address in the first IP block to another IP address in the first block or a probability of IP reassignment from an IP address in the first IP block to an IP address in the second IP block.

21. The computer program product of claim 17, wherein determining an observed number of IP reassignments comprises: for each IP address reassignment, determining which IP block the reassigned IP address is located in.

22. The computer program product of claim 17, wherein modifying services provided to one of the client devices based on the network information comprises providing a geographic-based service to one of the client devices based on the network information.

23. The computer program product of claim 17, wherein modifying services provided to one of the client devices based on the network information comprises modifying services provided to one of the client devices based on network metrics of other client devices in the plurality of client devices.

24. The computer program product of claim 17, wherein modifying services provided to one of the client devices based on the network information comprises restricting services provided to one of the client devices based on a restriction applied to another of the client devices in the plurality of client devices.

* * * * *